(12) United States Patent
Chu

(10) Patent No.: US 6,560,985 B1
(45) Date of Patent: May 13, 2003

(54) UNIVERSAL ACCUMULATOR ASSEMBLY

(76) Inventor: Henry C. Chu, 133 N. Lemon St., Orange, CA (US) 92866

( * ) Notice: Subject to any disclaimer, the term of this patent is extended or adjusted under 35 U.S.C. 154(b) by 0 days.

(21) Appl. No.: 10/094,870

(22) Filed: Mar. 12, 2002

(51) Int. Cl.[7] .......................... F25B 43/00; F25B 39/04; F03B 11/00; F17D 1/00; F16L 27/00
(52) U.S. Cl. ...................... 62/503; 62/509; 137/590; 137/593; 137/577; 285/184; 285/282; 285/30; 403/78; 403/84
(58) Field of Search .................. 62/503, 509; 137/590, 137/593, 577; 285/184, 282, 30; 403/78, 84

(56) References Cited

U.S. PATENT DOCUMENTS

| | | | | |
|---|---|---|---|---|
| 2,732,169 A | * | 1/1956 | Matteo | ....................... 251/148 |
| 3,942,332 A | * | 3/1976 | Schumacher | ................... 62/217 |
| 4,756,166 A | * | 7/1988 | Tomasov | ...................... 62/509 |
| 4,993,455 A | * | 2/1991 | Yanagisawa | ................. 137/592 |
| 5,491,983 A | * | 2/1996 | Hamilton et al. | .............. 62/503 |

* cited by examiner

Primary Examiner—William C. Doerrler
Assistant Examiner—Filip Zec
(74) Attorney, Agent, or Firm—Charles E. Baxley

(57) ABSTRACT

A universal accumulator device for an auto air conditioning system includes a housing having an inlet opening, one or more outlet openings, one or more inlet fittings selectively engaged with the inlet opening of the housing, and one or more outlet fittings selectively engaged with the outlet opening of the housing. The inlet and outlet fittings may include a metric or a British thread for coupling to the metric or British pipings or lock nuts. A tubing may be selectively secured to the fittings with one or more sealing rings and with an additional barrel.

13 Claims, 8 Drawing Sheets

UNIVERSAL ACCUMULATOR ASSEMBLY

BACKGROUND OF THE INVENTION

1. Field of the Invention

The present invention relates to an accumulator, and more particularly to a universal accumulator assembly for various kinds of vehicle air conditioning systems.

2. Description of the Prior Art

The typical accumulators are known in the art to be used in a vehicle air conditioning system intermediate to the evaporator and compressor, and comprise an inlet fitting for permitting passage of heavy vapor from the evaporator into a cylindrical canister and an outlet fitting for permitting suction of the refrigerant vapor from the canister to the compressor. The accumulators are provided for prohibiting liquid refrigerant from returning to the compressor and for providing dehydration via a desiccant located within the accumulator canister.

While changing the old accumulator with a new one, the type of accumulator should be chosen or selected according to the relative positions of the line from the evaporator and the line to the compressor. However, different vehicles may have different styles or designs of accumulators, such that a variety of styles or designs of accumulators are required to be selected or chosen to accommodate the various vehicle air conditioning systems.

For example, as shown in FIGS. 1A–1E, and 2A–2E, various kinds of typical accumulators are illustrated and comprise a number of canisters 70 each having a female inlet fitting 71 or a male inlet fitting 74 for coupling to the evaporators, and each having a male outlet fitting 72 for coupling to the compressors, and/or each further having one or more service fittings 73 for coupling to the pressure cycle switches or the like. The male outlet fittings 72 and the service fittings 73 are required to be disposed or extended from various angular positions from the canisters 70 for coupling to the compressors at different positions or locations relative to the canisters 70. The fittings 71, 72, 73, 74 are solidly secured to the canister 70 and may not be changed relative to the canister 70. Accordingly, a large number of accumulators are required for fitting to various kinds of vehicles; and a large number of accumulators are required to be prepared and stored as the inventory for the auto repair companies or stores.

In order to reduce the number of different designs and styles of accumulators, the canister may include an inlet fitting on the side thereof, and an outlet fitting in approximately the center of the bottom or the upper portion thereof. U.S. Pat. No. 4,835,986 to Carlisle, Jr., U.S. Pat. No. 4,866,951 to Masterson, II, U.S. Pat. No. 4,938,037 to Carlisle, Jr., U.S. Pat. No. 4,939,904 to Carlisle, Jr., U.S. Pat. No. 5,048,309 to Carlisle, Jr. disclose several of the typical universal accumulators and comprise an outlet fitting rotatably secured to the center of the upper portion of the canister for rotatably and adjustably securing or coupling to the compressors at different positions or locations relative to the canisters. However, the outlet fittings are rotatably secured to the canister and thus may not be solidly secured to the canister and may be easily become loose relative to the canister.

The present invention has arisen to mitigate and/or obviate the afore-described disadvantages of the conventional universal accumulators.

SUMMARY OF THE INVENTION

The primary objective of the present invention is to provide a universal accumulator assembly for various kinds of vehicle air conditioning systems.

In accordance with one aspect of the invention, there is provided a universal accumulator assembly comprising a housing including an inlet opening, and an outlet opening, a first inlet fitting and a second inlet fitting selectively engaged with the inlet opening of the housing, and a first outlet fitting and a second outlet fitting selectively engaged with the outlet opening of the housing.

The first inlet fitting may include a metric inner thread for coupling to a metric piping, and the second inlet fitting may include a British inner thread for coupling to a British piping.

The first inlet fitting may include a metric outer thread for coupling to a metric lock nut, and the second inlet fitting may include a British outer thread for coupling to a British lock nut.

The first inlet fitting may include an inner thread for coupling to a piping, and the second inlet fitting may include an outer thread for coupling to a lock nut.

The first and the second inlet fittings each may include a bore and an orifice formed therein for defining a peripheral shoulder therein, the universal accumulator assembly may further include a tubing having a first end for engaging into the orifice of the first and the second inlet fittings, at least one sealing ring engaged between the tubing and the first and the second inlet fittings, and a lock nut engaged with the tubing and engaged with the first and the second inlet fittings for securing the tubing to the first and the second inlet fittings.

A barrel may further be provided and selectively engaged into the orifice and engaged with the peripheral shoulder of the first and the second inlet fittings, and the sealing ring is engaged between the tubing and the barrel and the first and the second inlet fittings.

The housing may further include at least one second outlet opening formed therein and offset from the inlet opening and the outlet opening thereof for selectively receiving the first outlet fitting and the second outlet fitting.

The housing may further include at least one fastener for selectively engaging with the outlet opening and the second outlet opening thereof for selectively blocking the outlet opening and the second outlet opening thereof The first outlet fitting may include a metric outer thread for coupling to a metric lock nut, and the second outlet fitting may include a British outer thread for coupling to a British lock nut.

The first and the second outlet fittings each may include a bore and an orifice formed therein for defining a peripheral shoulder therein, the universal accumulator assembly may further include a tubing having a first end for engaging into the orifice of the first and the second outlet fittings, at least one sealing ring engaged between the tubing and the first and the second outlet fittings, and a lock nut engaged with the tubing and engaged with the first and the second outlet fittings for securing the tubing to the first and the second outlet fittings. A barrel may further be provided and selectively engaged into the orifice and engaged with the peripheral shoulder of the first and the second outlet fittings, and the sealing ring is engaged between the tubing and the barrel and the first and the second outlet fittings.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1C:
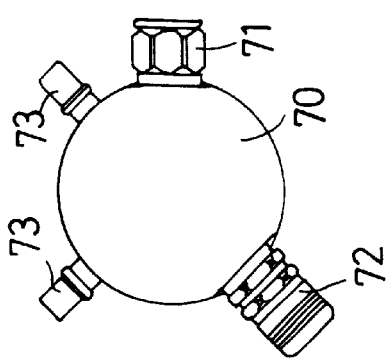
FIGS. 1A, 1B, 1C, 1D, 1E are top plan schematic views illustrating the typical accumulators having female inlet fittings.
Figure 1E:
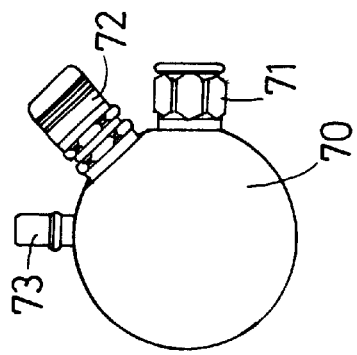
Figure 1B:
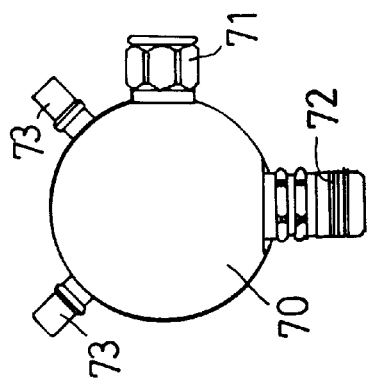
Figure 1D:
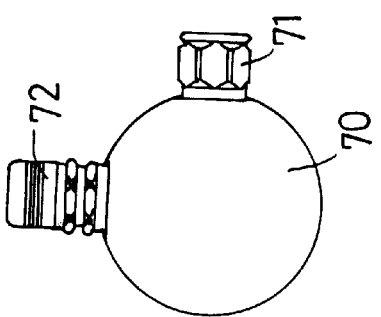
Figure 1A:
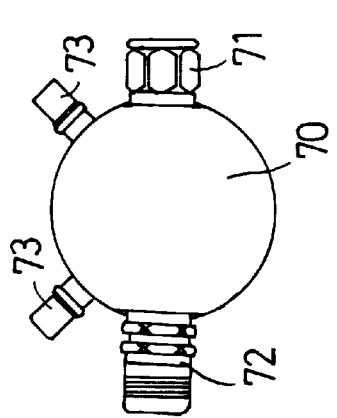
Figure 2A:
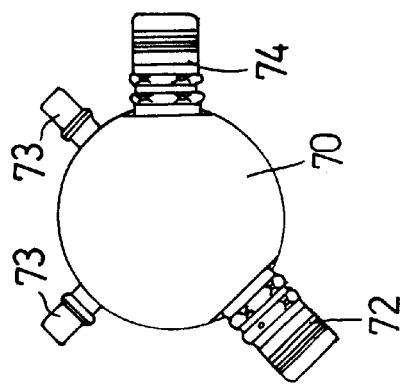
FIGS. 2A, 2B, 2C, 2D, 2E are top plan schematic views illustrating the typical accumulators having male inlet fittings.
Figure 2B:
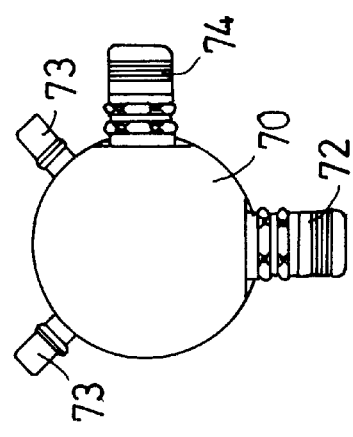
Figure 2C:
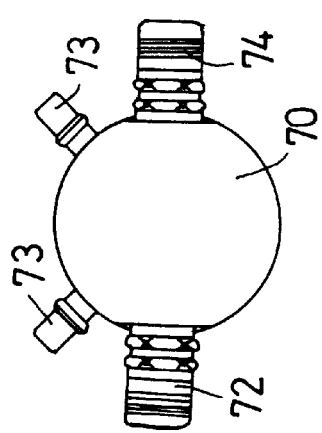
Figure 2D:
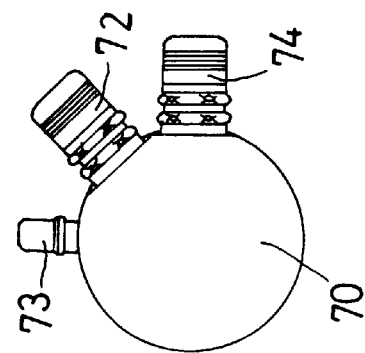
Figure 2E:
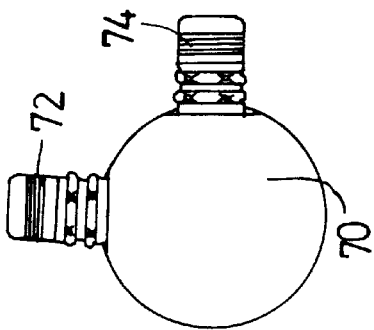
Figure 3:
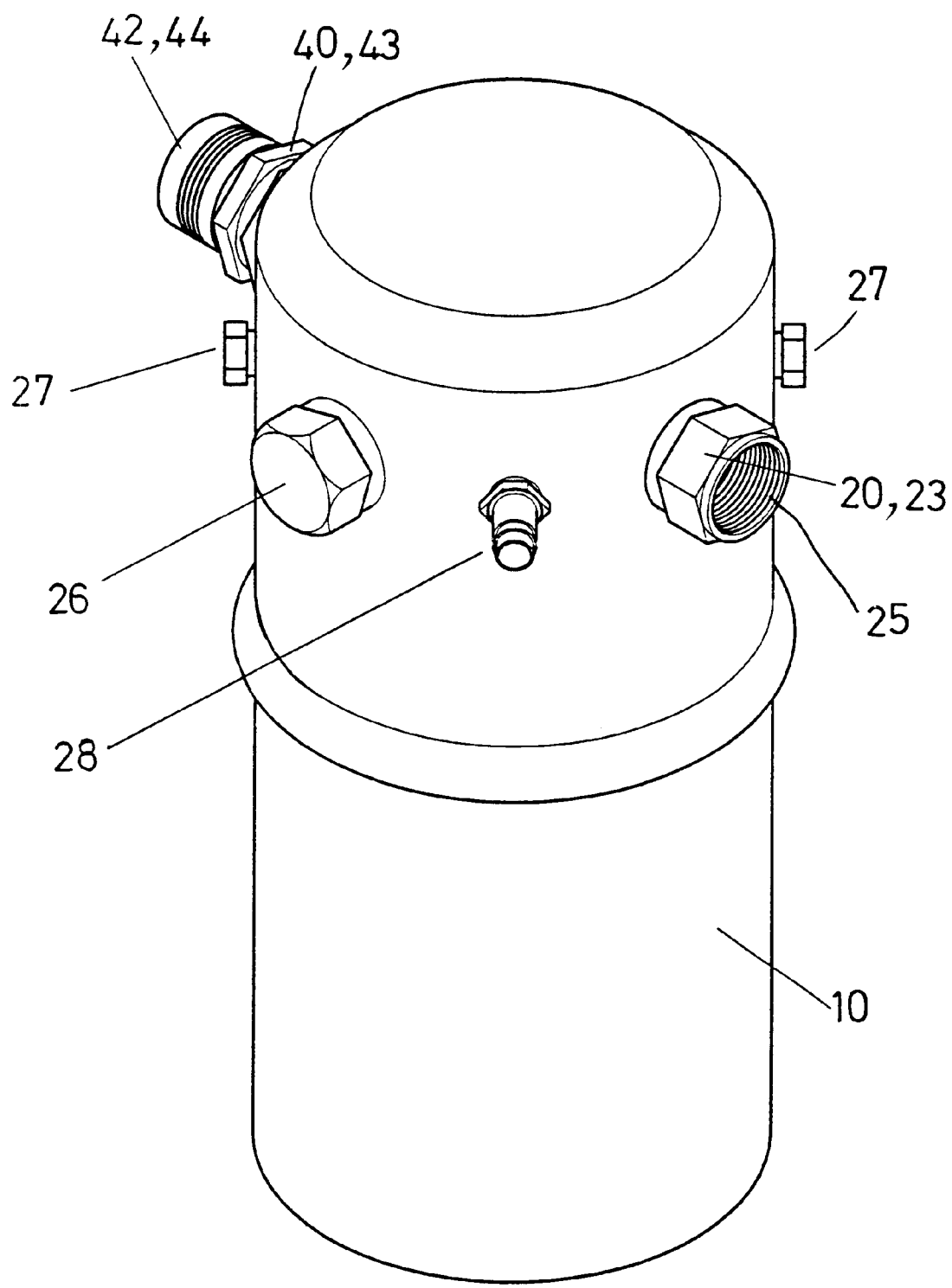
FIG. 3 is a perspective view of a universal accumulator assembly in accordance with the present invention.
Figure 4:
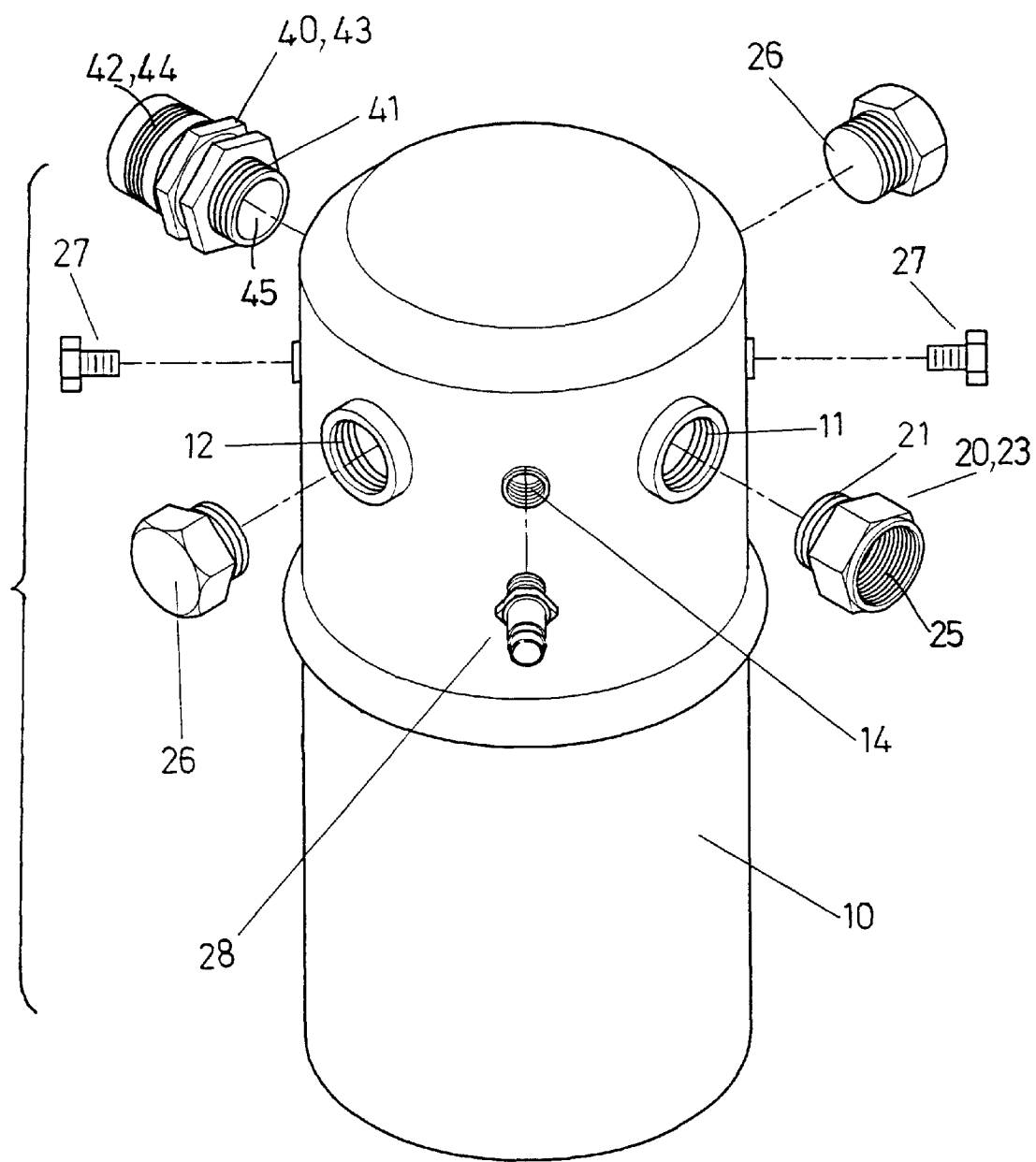
FIG. 4 is a partial exploded view of the universal accumulator assembly.
Figure 5:
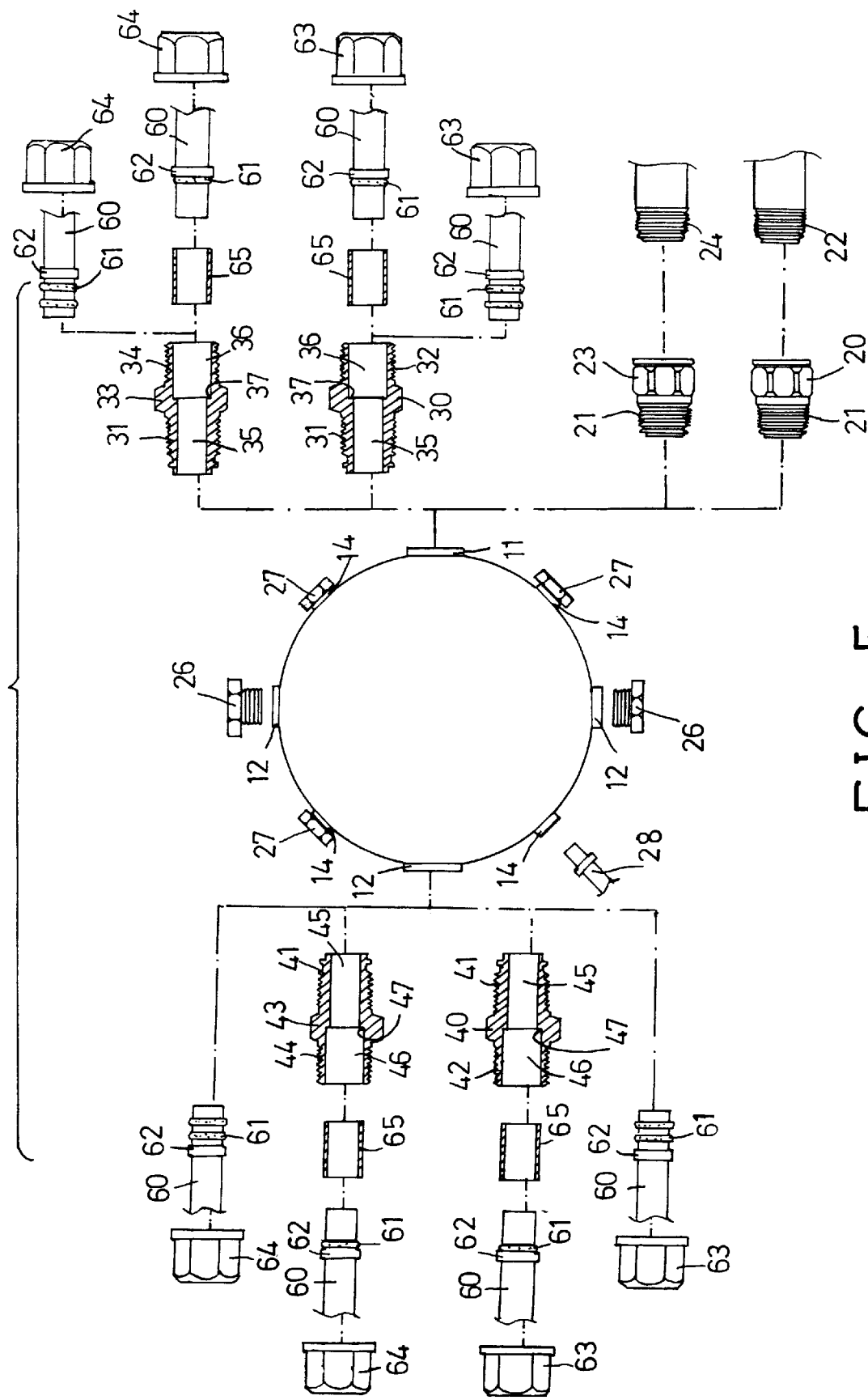
FIG. 5 is a plan and exploded schematic view illustrating the parts or elements of the universal accumulator assembly.

Referring to the drawings, and initially to FIGS. 3–5, a universal accumulator assembly in accordance with the present invention is provided for being used in a vehicle air conditioning system intermediate to the evaporator and compressor, and comprises a housing 10 including an inlet opening 11 formed therein, and one or more outlet openings 12 and one or more service openings 14 formed therein and offset from the inlet opening 11 at various or different angular positions. The universal accumulator assembly includes one or more female fittings 20, 23 and one or more male fittings 30, 33 each having a threaded member 21, 31 for threading and for selectively securing to the inlet opening 11 of the housing 10. The universal accumulator assembly further includes one or more male fittings 40, 43 each having a threaded end 41 for threading and for selectively securing to the outlet opening 12 of the housing 10.

Normally, a single outlet male fitting 40, 43 is provided for coupling to the vehicle air conditioning system, and secured to either of the outlet openings 12 of the housing 10. The other unused outlet openings 12 may then be sealed or blocked with fasteners 26. One or more service fittings 28 may be provided for coupling to the vehicle air conditioning system, and secured to either of the service openings 14 of the housing 10. The other unused service openings 14 may then be sealed or blocked with fasteners 27. The outlet fittings 40, 43 and the service fittings 28 may thus be selectively secured to the housing 10 at different angular position relative to the inlet opening 11, such that a single housing 10 is good enough for securing or coupling to various kinds of vehicle or auto air conditioning systems.

The inner thread 25 (FIGS. 3, 4) of the female fitting 20 may, for example, be a metric inner thread 25 for coupling to the metric pipings 22; and the inner thread 25 of the other female fitting 23 may, for example, include an inner thread 25 of a British system of units for coupling to the pipings 24 also of the British system of units. The outer thread 32 of the inlet male fitting 30 may, for example, be a metric outer thread 32 for coupling to the metric fastener or metric lock nuts 63; and the outer thread 34 of the other inlet male fitting 33 may, for example, include an outer thread 34 of a British system of units for coupling to the British fastener or British lock nuts 64. Similarly, the outer thread 42 of the outlet male fitting 40 may, for example, be a metric outer thread 42 for coupling to the metric fastener or metric lock nuts 63; and the outer thread 44 of the other outlet male fitting 43 may, for example, include an outer thread 44 of a British system of units for coupling to the British fastener or British lock nuts 64. The inlet female fittings 20, 23, and the inlet and outlet male fittings 30, 33, 40, 43 of different systems of units may further be provided for coupling a single housing 10 to the other different kinds of vehicle or auto air conditioning systems.

Figure 6:
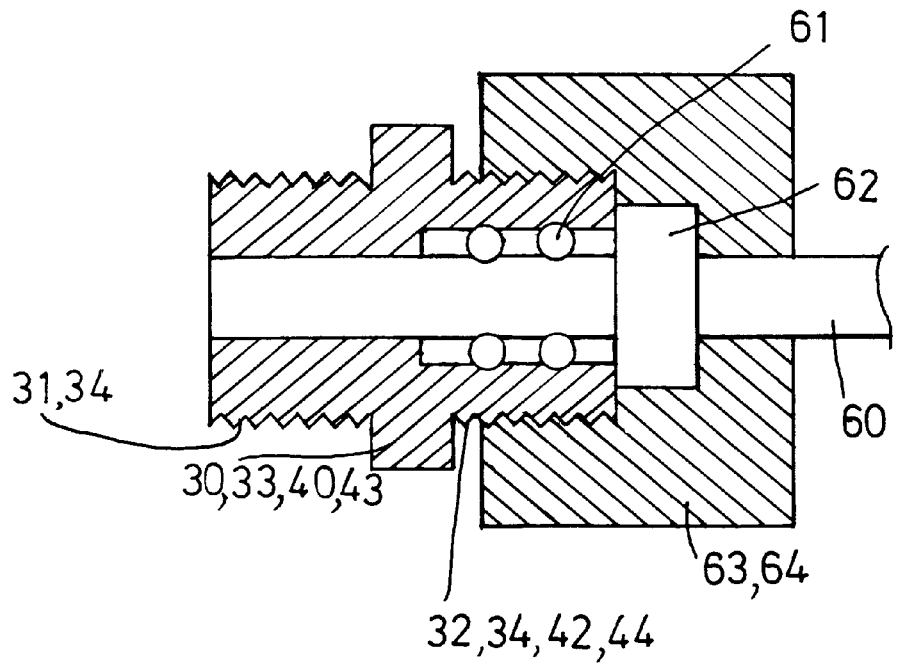
FIG. 6 is a cross sectional view illustrating a male insert double O-ring fitting for the universal accumulator assembly.

As shown in FIGS. 5 and 6, the male fittings 30, 33, 40, 43 each includes a bore 35, 45 and an orifice 36, 46 formed therein and having different inner diameters for forming or defining a peripheral shoulder 37, 47 in each of the fittings 30, 33, 40, 43. A tubing 60 may include one end engaged into the orifice 36, 46 of the fittings 30, 33, 40, 43, and may include a peripheral flange 62 for engaging with the outer end of the fittings 30, 33, 40, 43, and may include one or more sealing rings 61 engaged between the tubing 60 and the respective fittings 30, 33, 40, 43, for making an air tight or a water tight seal between the tubing 60 and the fittings 30, 33, 40, 43. The lock nuts 63, 64 may be used for solidly securing the tubings 60 and the sealing rings 61 to the fittings 30, 33, 40, 43 of different systems of units.

Figure 7:
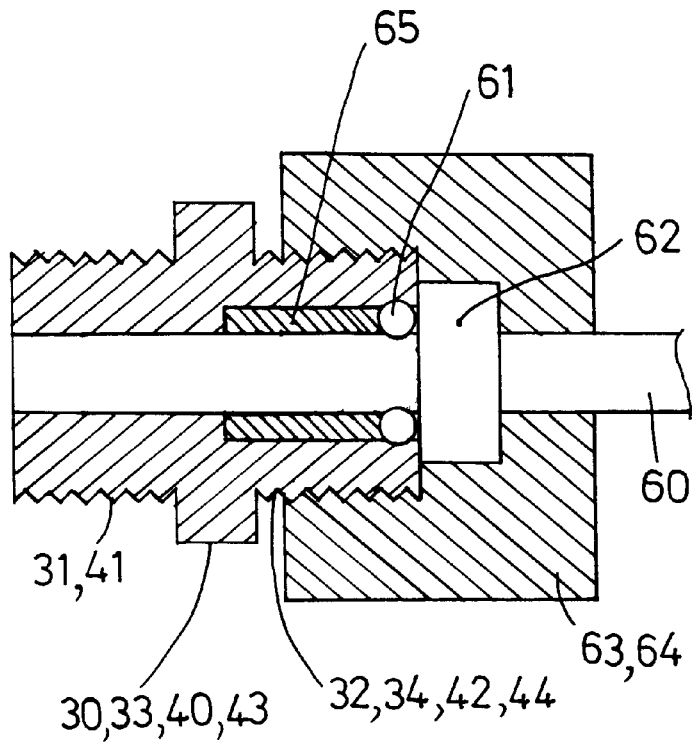
FIG. 7 is a cross sectional view similar to FIG. 6, illustrating a male insert single O-ring fitting for the universal accumulator assembly.

As shown in FIGS. 5 and 7, a barrel 65 may further be provided and selectively engaged into the orifice of the fittings 30, 33, 40, 43, the one end of the tubing 60 may be engaged through the barrel 65 and may also include a peripheral flange 62 for engaging with the outer end of the fittings 30, 33, 40, 43, and may include a single sealing ring 61 engaged between the tubing 60 and the barrel 65 and the respective fittings 30, 33, 40, 43, for making an air tight or a water tight seal between the tubing 60 and the barrel 65 and the fittings 30, 33, 40, 43. The lock nuts 63, 64 may also be used for selectively and solidly securing the tubings 60 and the sealing rings 61 to the fittings 30, 33, 40, 43 of different systems of units. The fittings 30, 33, 40, 43 of different systems of units may thus further be provided for coupling a single housing 10 to the tubings 60 with one or more sealing rings 61.

In operation, as shown in FIGS. 5, 6, 7, the inlet female fittings 20, 23, and the inlet and outlet male fittings 30, 33, 40, 43 of different systems of units may thus be provided and used for solidly and selectively coupling a single housing 10 to the pipings 22, 24 or tubings 60 of different kinds of vehicle or auto air conditioning systems. The outlet fittings 40, 43 may also be selectively secured to either of the outlet openings 12 of the housing 10 at different angular position relative to the inlet opening 11, such that the housing 10 is also good for securing or coupling to the other types or styles or designs of vehicle or auto air conditioning systems. The tubings 60 may also be provided for coupling the housing 10 with different fittings 30, 33, 40, 43 and one or more sealing rings 61.

Figure 8:
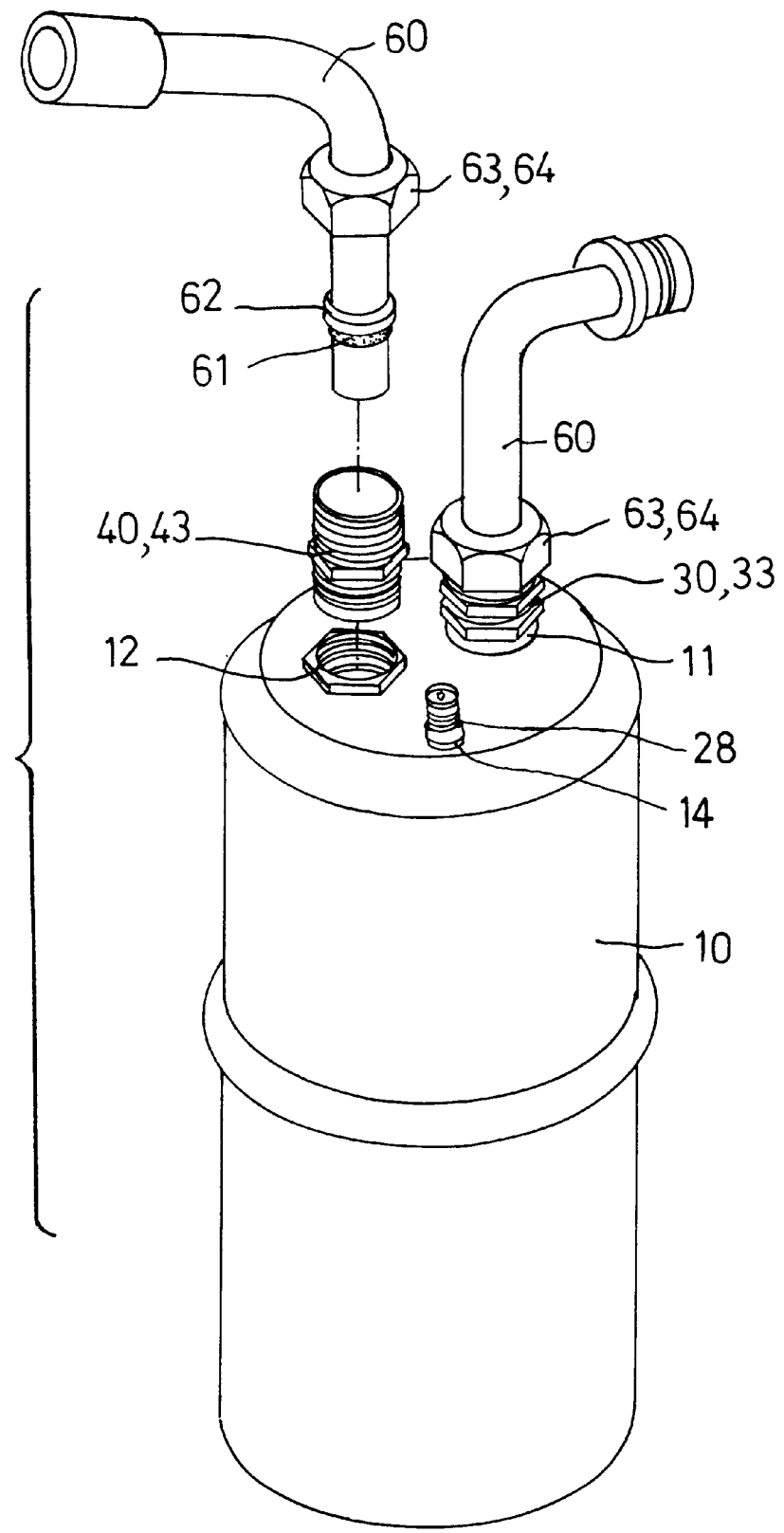
FIG. 8 is a partial exploded view illustrating the other application of the universal accumulator assembly.
Figure 10:
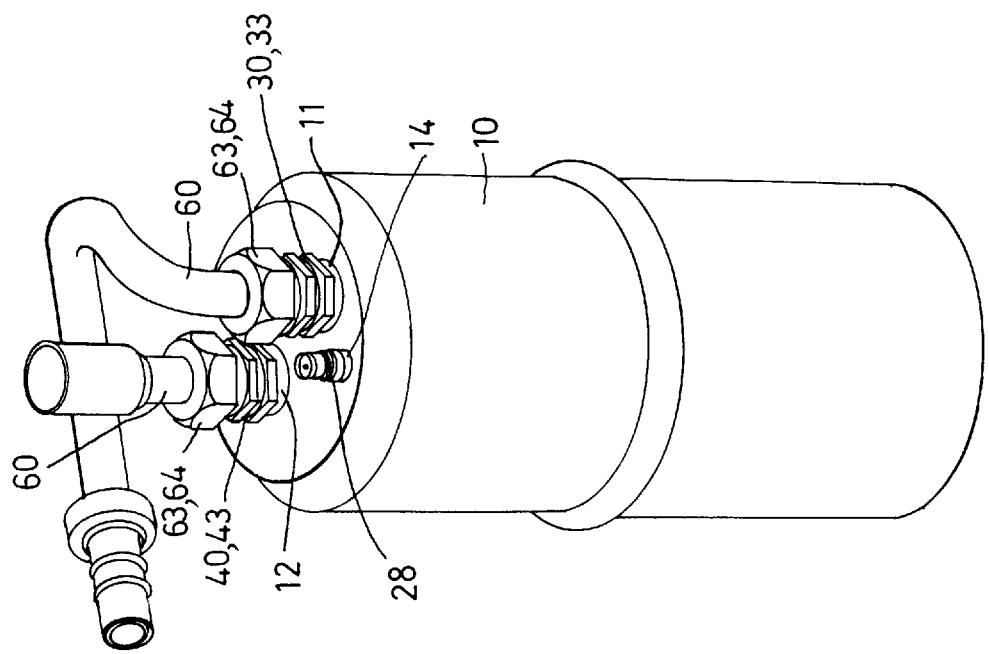
FIGS. 9 and 10 are perspective views illustrating the other applications of the universal accumulator assembly similar to that shown in FIG. 8.
Figure 9:
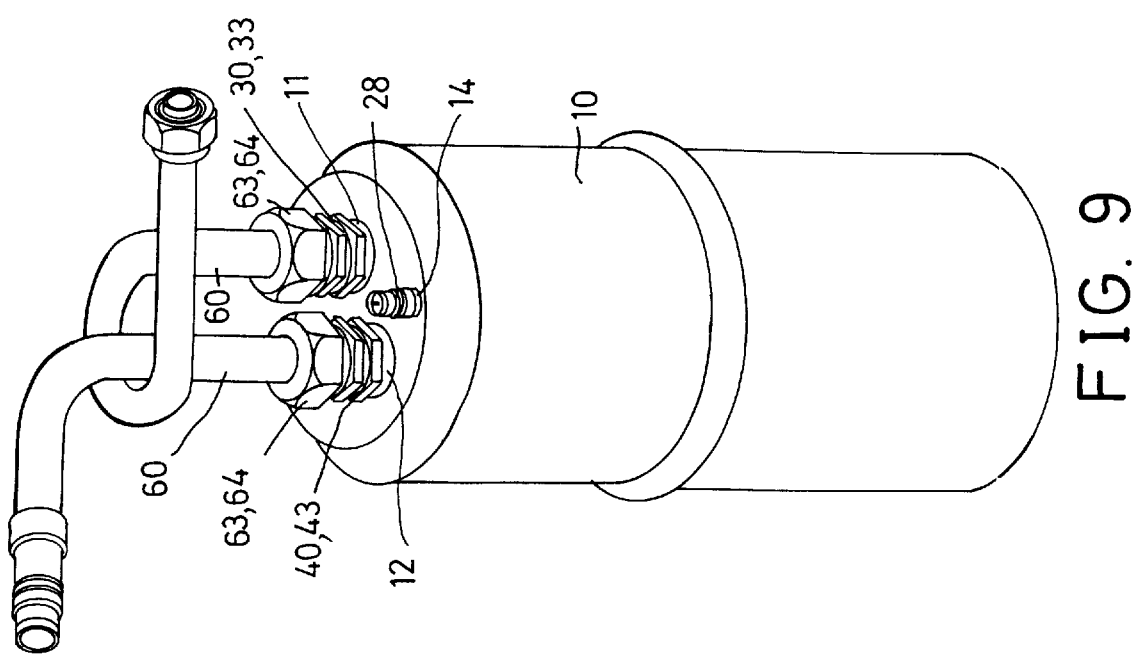

Referring next to FIGS. 8–10, the universal accumulator assembly may include the housing 10 having an inlet opening 11 and one or more outlet openings 12 and one or more service openings 14 formed on top of the housing 10, and one or more male fittings 30, 33 and lock nuts 63, 64 for locking various kinds of tubings 60 to the inlet opening 11 of the housing 10, and one or more male fittings 40, 43 and lock nuts 63, 64 for locking various kinds of tubings 60 to the outlet opening 12 of the housing 10. The tubings 60 may include various kinds of shapes or configuration for allowing universal accumulator assembly to be attached to various kinds of vehicle air conditioning systems.

Accordingly, the universal accumulator assembly in accordance with the present invention may include fewer parts or elements for accommodating or attaching to various kinds of vehicle air conditioning systems.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A universal accumulator assembly comprising:

a housing including an inlet opening, and an outlet opening, a first inlet fitting and a second inlet fitting selectively engaged with said inlet opening of said housing, and a first outlet fitting and a second outlet fitting selectively engaged with said outlet opening of said housing, wherein said first inlet fitting includes a metric inner thread for coupling to a metric piping, and said second inlet fitting includes a British inner thread for coupling to a British piping.

2. The universal accumulator assembly according to claim 1, wherein said first inlet fitting includes a metric outer thread for coupling to a metric lock nut, and said second inlet fitting includes a British outer thread for coupling to a British lock nut.

3. The universal accumulator assembly according to claim 1, wherein said first inlet fitting includes an inner thread for coupling to a piping, and said second inlet fitting includes an outer thread for coupling to a lock nut.

4. The universal accumulator assembly according to claim 1, wherein said first and said second inlet fittings each includes a bore and an orifice formed therein for defining a peripheral shoulder therein, said universal accumulator assembly further includes a tubing having a first end for engaging into said orifice of said first and said second inlet fittings, at least one sealing ring engaged between said tubing and said first and said second inlet fittings, and a lock nut engaged with said tubing and engaged with said first and said second inlet fittings for securing said tubing to said first and said second inlet fittings.

5. The universal accumulator assembly according to claim 4 further comprising a barrel selectively engaged into said orifice and engaged with said peripheral shoulder of said first and said second inlet fittings, and said at least one sealing ring is engaged between said tubing and said barrel and said first and said second inlet fittings.

6. The universal accumulator assembly according to claim 1, wherein said housing further includes at least one second out let opening formed therein and offset from said inlet opening and said outlet opening thereof for selectively receiving said first outlet fitting and said second outlet fitting.

7. The universal accumulator assembly according to claim 6, wherein said housing further includes at least one fastener for selectively engaging with said outlet opening and said at least one second outlet opening thereof for selectively blocking said outlet opening and said at least one second outlet opening thereof.

8. The universal accumulator assembly according to claim 1, wherein said first outlet fitting includes a metric outer thread for coupling to a metric lock nut, and said second outlet fitting includes a British outer thread for coupling to a British lock nut.

9. The universal accumulator assembly according to claim 1, wherein said first and said second outlet fittings each includes a bore and an orifice formed therein for defining a peripheral shoulder therein, said universal accumulator assembly further includes a tubing having a first end for engaging into said orifice of said first and said second outlet fittings, at least one sealing ring engaged between said tubing and said first and said second outlet fittings, and a lock nut engaged with said tubing and engaged with said first and said second outlet fittings for securing said tubing to said first and said second outlet fittings.

10. The universal accumulator assembly according to claim 9 further comprising a barrel selectively engaged into said orifice and engaged with said peripheral shoulder of said first and said second outlet fittings, and said at least one sealing ring is engaged between said tubing and said barrel and said first and said second outlet fittings.

11. The universal accumulator assembly according to claim 1, wherein said housing includes a peripheral portion, said inlet opening and said outlet opening are formed in said peripheral portion of said housing.

12. The universal accumulator assembly according to claim 1, wherein said housing includes an upper portion, said inlet opening and said outlet opening are formed in said upper portion of said housing.

13. A fitting device for a universal accumulator assembly comprising:

a fitting body including an orifice and peripheral shoulder formed therein, a tubing including a first end for engaging into said orifice of said fitting body, at least one sealing ring engaged between said tubing and said fitting body, a lock nut engaged with said tubing and engaged with said fitting body for securing said tubing to said fitting body, and a barrel selectively engaged into said orifice and engaged with said peripheral shoulder of said fitting body and engaged with said at least one sealing ring.

* * * * *